Patented July 25, 1939

2,167,043

UNITED STATES PATENT OFFICE 2,167,043

METHOD OF RECOVERING FATS, OILS, AND PROTEINS FROM ANIMAL AND VEGETABLE STARTING MATERIALS, AND MORE PARTICULARLY FROM WASTE PRODUCTS

Hans Haneschka, Vienna, Austria

No Drawing. Application November 23, 1937, Serial No. 176,062. In Austria November 17, 1936

4 Claims. (Cl. 87—13)

This invention relates to the recovery of fats, oils, and train-oils, and protein products, from animal and vegetable starting materials, and more particularly from waste and offal, such as for instance slaughter-house garbage. Hitherto such matter has been treated for the recovery of useful constituents of the nature indicated by scalding with hot water and separating the fat from the resulting liquor according to specific gravity by means of conventional fat separating devices. This method is attended by the drawback that in the first place the fat yield is slight, and in the second place as a result there is too much fat left in the residue and in the products obtained therefrom. Owing to the resulting excessive fat content more particularly the fodder meal obtained is apt to spoil quickly and does not in other respects satisfy the requirements of scientific foddering.

On the other hand methods are known, for producing soluble protein preparations from meat, meat meal, or richly proteinous vegetable matter, by treating the material concerned with ammonia or solutions of readily dissociating ammonium salts, with or without lixiviation, at elevated temperature, followed by evaporation. The starting material used in this method is freed from the whole or the greater part of its fat content before being subjected to the treatment for the production of the protein preparations.

In contrast to these known methods, the present invention has for its object to provide a method by which practically complete separation of the fatty substances from the protein products recoverable from animal or vegetable starting materials containing fats, oils, train-oils, and the like is rendered possible in a single working operation. This result is achieved in accordance with the invention by treating the starting material containing fat and protein with ammonia, with the addition of primary ammonium phosphate, at elevated temperature, under pressure and agitation, and continuing this treatment until there is formed an aqueous protein containing liquor in which the fat is emulsified, and then effecting separation of the fatty matter from the liquor in separators or the like.

The most advantageous way of practising the invention is to introduce steam into containers in which the garbage not freed from fat, oil, and the like has previously been placed together with the necessary addition of chemicals. The steam in the first place provides the necessary temperature, in the second place furnishes by condensation the requisite quantity of liquid, and finally also enables the necessary pressure to be maintained in the container. The boiling process is shortened by the use of the added chemicals, and in this way the protein matter is saved from harm that might otherwise be done to it.

According to the desired nature of the protein-containing final products it is possible, by continuing boiling for a shorter or longer time, or by increasing or decreasing the amount of chemicals added, either to retain the existing protein structure or to effect the breaking down (peptonizing) thereof. It is likewise possible to convert indigestible proteins into digestible.

By the addition of ammonia in conjunction with primary ammonium phosphate, in accordance with the invention, the protein is dissolved and any acids present are also neutralized. Any excess of ammonia is subsequently driven off or withdrawn with the aid of exhausters, in the course of the further working up of the products.

It is inherent in the nature of the method according to the invention that saponification of the fat contained in the starting material is avoided by the employment of slight quantities of ammonia and a relatively short reacting time.

Furthermore, any organic acids such as for instance sarcosarcous acid, butyric acid, lactic acid, and the like already present or evolved in the course of the treatment are neutralized by the ammonia used, so that an excess of such acid can hardly become formed.

The following example of the carrying out of the method according to the invention will serve to illustrate the invention and to render the same more readily understandable.

Into a container there is introduced 1000 kgs. of slaughter-house garbage, rejected meat, waste leather, whale flesh, fish offal, intestinal mucilage, cereals, cattle cake, press residue, and the like, with various concomitants such as bones, hair, sinews, scales, and the like, or the contents of the first stomach of ruminants, after which 12 to 20 kgs. of concentrated ammonia and ammonium phosphate in a quantity up to one-tenth of the amount of ammonia used are added. The container is then closed, steam let in, and the pressure adjusted to up to 3 atm. pressure in excess of atmospheric. The mixture is kept constantly stirred by means of an agitator built into the container, and within 25 to 40 minutes there is formed a protein broth in which the fat is emulsified. The duration of boiling and the quantity of chemicals used depends generally speaking on the nature of the starting material and its albumin content. If it is desired not to destroy the digestible protein it is advisable not to add more than 20 kgs. of ammonia and to keep a check on the boiling process. If it is desired for instance to decompose the protein the mixture should be kept diluted, using the same quantities of ammonia and ammonium phosphate as before, and the duration of boiling increase say to 1 to 1½ hours.

If it is desired to convert indigestible protein into digestible larger quantities, for instance 40 kgs. of ammonia and ammonium phosphate should be added, in which case the boiling time must be increased to about 2 hours. By adaptation of the quantities of chemicals used, degree of dilution, and length of boiling to suit the starting material used and the desired final product it is perfectly possible to adjust the working conditions for obtaining a desired result. From the container the emulsified broth is fed to separators, and after the fatty matter has been separated off, the remaining broth is dried in a drying plant and the resulting product further worked up into fodder meal.

The advantages of the invention are obvious. In the first place it enables a very considerably higher fat yield to be obtained, and in the second place it enables better fodder meal to be produced, both products being practically free of smell. In the described manner it is possible to produce meat, fish, or whale meals or vegetable protein fodder meals of improved properties.

The invention is thus of particular significance both for the slaughtering industry and also for the whaling industry, although its application is not of course limited to these fields.

I claim:

1. The herein described method for recovering fats and protein products from waste, refuse, garbage and other animal and vegetable starting materials containing fats and proteins, which method comprises the steps of admixing to the starting material an alkaline matter consisting of ammonia and an addition of primary ammonium phosphate, boiling the mixture by treating it with direct steam under pressure and simultaneous agitation until an aqueous protein broth is formed in which the fats derived from the starting material are emultisfied, separating said broth with the emulsified fat from the residue of the starting material, and then separating the broth from the fats.

2. A method, as claimed in claim 1, in which 1 to 2 parts of said alkaline matter are added to 100 parts of starting material and the mixture is boiled for about 25 to 40 minutes to produce a broth in which the proteins are preserved without decomposition.

3. A method, as claimed in claim 1, in which 1 to 2 parts of said alkaline matter are admixed to 100 parts of starting material and the mixture is boiled for about 1 to 1½ hours to produce a broth in which the proteins are peptonized.

4. A method, as claimed in claim 1, in which at least 2 parts of said alkaline matter are admixed to 100 parts of the starting material and the mixture is boiled for about 1½ to 2 hours to produce a broth in which the indigestible proteins are converted and decomposed into digestible proteins.

HANS HANESCHKA.